(12) United States Patent
Thekkath

(10) Patent No.: US 7,412,630 B2
(45) Date of Patent: Aug. 12, 2008

(54) TRACE CONTROL FROM HARDWARE AND SOFTWARE

(75) Inventor: Radhika Thekkath, Palo Alto, CA (US)

(73) Assignee: MIPS Technologies, Inc., Mountain View, CA (US)

(*) Notice: Subject to any disclaimer, the term of this patent is extended or adjusted under 35 U.S.C. 154(b) by 0 days.

(21) Appl. No.: 11/676,242

(22) Filed: Feb. 16, 2007

(65) Prior Publication Data

US 2007/0180327 A1    Aug. 2, 2007

Related U.S. Application Data

(63) Continuation of application No. 09/844,669, filed on Apr. 30, 2001, now Pat. No. 7,185,234.

(51) Int. Cl.
*G06F 11/00* (2006.01)
(52) U.S. Cl. ............................. 714/45; 714/35; 717/128
(58) Field of Classification Search ................... 714/38, 714/45, 25, 39, 51, 50, 35; 717/128
See application file for complete search history.

(56) References Cited

U.S. PATENT DOCUMENTS

| | | | |
|---|---|---|---|
| 3,473,154 A | 10/1969 | Couleur et al. | |
| 3,585,599 A | 6/1971 | Hitt | |
| 3,681,534 A | 8/1972 | Burian et al. | |
| 3,702,989 A | 11/1972 | Provenzano, Jr. et al. | |
| 3,704,363 A | 11/1972 | Salmassy et al. | |
| 3,707,725 A | 12/1972 | Dellheim | |
| 3,771,131 A | 11/1973 | Ling | |
| 3,794,831 A | 2/1974 | Frankeny et al. | |
| 3,805,038 A | 4/1974 | Buedel et al. | |
| 3,906,454 A | 9/1975 | Martin | |
| 4,205,370 A | 5/1980 | Hirtle | |
| 4,293,925 A | 10/1981 | Hang et al. | |
| 4,423,508 A | 12/1983 | Shiozaki et al. | |
| 4,462,077 A | 7/1984 | York | |
| 4,503,495 A | 3/1985 | Boudreau | |
| 4,511,960 A | 4/1985 | Boudreau | |
| 4,539,682 A | 9/1985 | Herman et al. | |
| 4,553,223 A | 11/1985 | Bouhelier et al. | |
| 4,554,661 A | 11/1985 | Bannister | |
| 4,590,550 A | 5/1986 | Eilert et al. | |

(Continued)

FOREIGN PATENT DOCUMENTS

GB        2 329 048      10/1999

(Continued)

OTHER PUBLICATIONS

Faloutsos, Christos et al., "Description and Performance Analysis of Signature File Methods for Office Filing", *ACM Transactions on Office Information Systems*, (Jul. 1987), 5:3:237-257.
Embedded Trace Macrocell (Rev 1) Specification, (2000).
MIPS64 5Kc™ Processor Core Datasheet, Revision 1.7.4, ppl-40, Dec. 14, 1999.
MIPS64 5Kc™ Processor Core Datasheet, Revision 1.7.5, ppl-40, Aug. 11, 2000.
MIPS64 5Kc™ Processor Core Datasheet, Revision 2.0, ppl-44, Aug. 28, 2000.
MIPS64™ 5Kf™ Processor Core Datasheet, Revision 00.11, ppl-44, Mar. 30, 2001.

(Continued)

*Primary Examiner*—Christopher S McCarthy
(74) *Attorney, Agent, or Firm*—Cooley Godward Kronish LLP

(57) ABSTRACT

A system and method for program counter and data tracing is disclosed. The tracing mechanism of the present invention enables increased visibility into the hardware and software state of the processor core.

9 Claims, 8 Drawing Sheets

U.S. PATENT DOCUMENTS

| | | | |
|---|---|---|---|
| 4,742,466 A | 5/1988 | Ochiai et al. | |
| 4,783,762 A | 11/1988 | Inoue et al. | |
| 4,835,675 A | 5/1989 | Kawai | |
| 5,058,114 A | 10/1991 | Kuboki et al. | |
| 5,084,814 A | 1/1992 | Vaglica et al. | |
| 5,150,470 A | 9/1992 | Hicks et al. | |
| 5,274,811 A | 12/1993 | Borg et al. | |
| 5,289,587 A | 2/1994 | Razban | |
| 5,359,608 A | 10/1994 | Belz et al. | |
| 5,404,470 A | 4/1995 | Miyake | |
| 5,434,622 A | 7/1995 | Lim | |
| 5,471,594 A | 11/1995 | Stone | |
| 5,533,193 A | 7/1996 | Roscoe | |
| 5,581,691 A | 12/1996 | Hsu et al. | |
| 5,621,886 A | 4/1997 | Alpert et al. | |
| 5,625,785 A | 4/1997 | Miura et al. | |
| 5,689,636 A | 11/1997 | Kleber et al. | |
| 5,689,694 A | 11/1997 | Funyu | |
| 5,715,435 A | 2/1998 | Ikei | |
| 5,748,904 A | 5/1998 | Huang et al. | |
| 5,751,942 A | 5/1998 | Christensen et al. | |
| 5,754,861 A | 5/1998 | Kumar | |
| 5,812,868 A | 9/1998 | Moyer et al. | |
| 5,832,515 A | 11/1998 | Ledain et al. | |
| 5,848,264 A | 12/1998 | Baird et al. | |
| 5,878,208 A | 3/1999 | Levine et al. | |
| 5,918,004 A | 6/1999 | Anderson et al. | |
| 5,946,486 A | 8/1999 | Pekowski | |
| 6,009,270 A | 12/1999 | Mann | |
| 6,012,085 A | 1/2000 | Yohe et al. | |
| 6,032,268 A | 2/2000 | Swoboda et al. | |
| 6,106,573 A | 8/2000 | Mahalingaiah et al. | |
| 6,119,247 A | 9/2000 | House et al. | |
| 6,256,777 B1 | 7/2001 | Ackerman | |
| 6,282,701 B1 | 8/2001 | Wygodny et al. | |
| 6,314,530 B1 | 11/2001 | Mann | |
| 6,338,159 B1 | 1/2002 | Alexander | |
| 6,353,924 B1 | 3/2002 | Ayers et al. | |
| 6,457,144 B1 | 9/2002 | Eberhard | |
| 6,467,083 B1 | 10/2002 | Yamashita | |
| 6,487,715 B1 | 11/2002 | Chamdani et al. | |
| 6,530,076 B1 | 3/2003 | Ryan et al. | |
| 6,557,119 B1 | 4/2003 | Edwards et al. | |
| 6,615,370 B1 | 9/2003 | Edwards et al. | |
| 6,615,371 B2 | 9/2003 | McCullough et al. | |
| 6,658,649 B1 | 12/2003 | Bates et al. | |
| 6,684,348 B1 | 1/2004 | Edwards et al. | |
| 6,687,865 B1 | 2/2004 | Dervisoglu et al. | |
| 6,754,804 B1 | 6/2004 | Hudepohl et al. | |
| 6,918,065 B1 | 7/2005 | Edwards et al. | |
| 6,983,453 B2 | 1/2006 | Strait et al. | |
| 7,043,668 B1 | 5/2006 | Treue et al. | |
| 7,055,070 B1 | 5/2006 | Uhler et al. | |
| 7,069,544 B1 | 6/2006 | Thekkath et al. | |
| 7,124,072 B1 | 10/2006 | Thekkath et al. | |
| 7,134,166 B2 | 11/2006 | Wright et al. | |
| 7,168,066 B1 | 1/2007 | Thekkath et al. | |
| 7,178,133 B1 | 2/2007 | Thekkath et al. | |
| 7,181,728 B1 | 2/2007 | Thekkath et al. | |
| 7,197,671 B2 * | 3/2007 | Swaine et al. | 714/45 |
| 7,206,734 B2 * | 4/2007 | Swoboda | 703/26 |
| 7,207,035 B2 * | 4/2007 | Kobrosly et al. | 717/128 |
| 2001/0054175 A1 | 12/2001 | Watanabe | |
| 2002/0046393 A1 | 4/2002 | Leino et al. | |
| 2002/0147965 A1 | 10/2002 | Swaine et al. | |
| 2002/0184477 A1 | 12/2002 | Swaine et al. | |
| 2004/0025145 A1 | 2/2004 | Dawson | |
| 2007/0011492 A1 * | 1/2007 | Swaine | 714/35 |

FOREIGN PATENT DOCUMENTS

| | | |
|---|---|---|
| GB | 2 329 049 | 10/1999 |

OTHER PUBLICATIONS

MIPS64 5Kc™ Processor Core Software User's Manual, Revision 2.2, ppl-580, Aug. 11, 2000.

Embedded Trace Macrocell Specification, Rev. 0/0a, ARM IHI 0014C, ARM Ltd. (1999).

Susan J. Eggers, et al., "Techniques for Efficient Inline Tracing on a Shared-Memory Multiprocessor," University of Washington, *1990 ACM*, pp. 37-47.

Richard A. Uhlig, et al., "Trace-Driven Memory Simulation: A Survey," Intel Microcomputer Research lab; University of Michigan, *ACM Computing Surveys*, vol. 29, No. 2, Jun. 1997, pp. 128-170.

Eric Rotenberg, et al., "Trace Processors," University of Wisconsin, *1997 IEEE Service Center*, 12 pp.

E.N. Elnozahy, "Address Trace Compression Through Loop Detection and Reduction," © *1999 ACM 1-58113-083* pp. 214, 215.

Darren Jones, "Opal Coprocessor Interface," *MIP Propietary/Confidential*, Jun. 4, 1999, pp. 1-18.

Darren Jones, *MIPSS64™ 5KC™ Processor Cores User's Manual*, Rev. 1.0, Jul. 4, 1999, pp. 6-1 to 6-26.

*MIPSS64™ 5KC™ Processor Cores User's Manual*, Rev. 1.0.1., 1999, pp. 247-276.

F. Chow et al., "Engineering a RISC Compiler System," IEEE COMP-CON, Mar. 1986, pp. 132-137.

M.D. Smith, "Tracing with Pixie," *Technical Report CSL-TR-91-497*, Stanford University, Computer Systems Laboratory, Nov. 1991, pp. 1-29.

ATOM Reference Manual, *Digital Equipment Corporation*, Massachusetts, Dec. 1993, pp. 1-32.

A. Srivastaba et al., "ATOM: A System for Building Customized Program Analysis Tools," *WRL, Research* Report 94/2 Digital Equipment Corporation, Massachusetts, Mar. 1994, pp. 1-23.

ATOM User Manual, Digital Equipment Corporation, Mar. 1994, pp. 1-28.

B. Cmelik et al., "Shade: A Fast Instruction-Set Simulator for Execution Profiling," *Proceedings of the 1994 ACM SIGMETRICS Conference*, SIGMETRICS, California, May 1994, pp. 128-137.

MIPS Technologies, "MIPS64 5K™ Processor Cor Integrator's Guide;" [Document No. MD00056]; *MIPS Technologies Inc.*; Rev. 1.2; Aug. 11, 2000; pp. I-II, 1-82.

MIPS Technologies; "MIPS64™5K™Processor Core Family Integrator's Guide;" [Document No. MD00106]; © *1999-2001 MIPS Technologies, Inc.*; Rev. 02.00; Jan. 15, 2001; pp. I-VIII, 1-75.

MIPS Technologies, "Core Processor Interface Specification;" [Document No. MD00068]; *MIPS Technologies, Inc.*; Rev. 1.11; Mar. 30, 2001; pp. 1-26.

Hudepohl et al, U.S. Appl. No. 09/751,747, filed Dec. 29, 2000.

Hudepohl et al, U.S. Appl. No. 09/751,748, filed Dec. 29, 2000.

Radhika Thekkath et al, U.S. Appl. No. 09/844,671, filed Apr. 30, 2001.

Radhika Thekkath et al, U.S. Appl. No. 09/844,669, filed Apr. 30, 2001.

Radhika Thekkath et al, U.S. Appl. No. 09/844,668, filed Apr. 30, 2001.

Radhika Thekkath et al, U.S. Appl. No. 09/844,673, filed Apr. 30, 2001.

Radhika Thekkath et al, U.S. Appl. No. 09/844,271, filed Apr. 30, 2001.

Radhika Thekkath et al, U.S. Appl. No. 09/844,670, filed Apr. 30, 2001.

Franz Treue et al, U.S. Appl. No. 09/894,831, filed Jun. 29, 2001.

Radhika Thekkath et al, U.S. Appl. No. 09/894,832, filed Jun. 29, 2001.

The Authoratative Dictionary of IEEE Standards Terms, 7th Ed., IEEE Press, 2000.

* cited by examiner

TRACE CONTROL FROM HARDWARE AND SOFTWARE

BACKGROUND

1. Field of the Invention

The present invention relates generally to on-chip debugging, and more specifically to program counter (PC) and data tracing in embedded processor systems.

2. Discussion of the Related Art

Computer systems process information according to a program that includes a sequence of instructions defined by an application program or an operating system. Typically, a program counter provides a series of memory addresses that are used by the processor for fetching instructions stored in the associated memory. In this process, the processor conveys the memory address to the memory over an address bus, and the memory responds over an instruction/data bus with the instruction stored in the addressed memory location. The instructions stored in the memory constitute the program to be executed.

Program development relies heavily on the verification of the instructions stored in memory as well as their corresponding execution. This task represents an ever-increasing burden due to the growth in software complexity and the increase in processor clock speeds. Typically, these debug efforts are supported by instruction tracing tools that generate a listing of executed instructions during the execution of a program.

Computer engineers rely on tracing results to gain a view of process and data states while the computer system is operating. Hardware engineers rely on tracing results to determine how new computer hardware architectures perform with existing operating systems and application programs. Finally, software engineers rely on tracing results to identify critical code segments and data structures.

In general, the cost of developing and debugging new software products can be a significant factor in processor selection. A processor's failure to adequately support software debug efforts can result in longer development times. This factor can easily reduce the processor's attractiveness to particular segments of the processor industry.

The increased control and flexibility in the generation of tracing data is particularly important for the embedded processor industry. In the embedded processor industry, specialized on-chip circuitry is often combined with a processor core. Embedded processors typically balance numerous design tradeoffs such as the number of I/O-port pins and the die size costs. A reduced I/O-port pin count results in lower bandwidth for trace data, therefore placing a premium on the efficiency of the tracing mechanism. This example is reflective of the embedded processor industry's general need for a set of efficient, low-cost, debugging tools.

DETAILED DESCRIPTION

An embodiment of the invention is discussed in detail below. While specific implementations are discussed, it should be understood that this is done for illustration purposes only. A person skilled in the relevant art will recognize that other components and configurations may be used without departing from the spirit and scope of the invention.

The provision of increased control and flexibility in the tracing process enables hardware, software, and computer engineers to effectively debug the operation of a computer system. These debugging efforts are enhanced when increased visibility is provided into the hardware and software state of the processor core. This is particularly true when dealing with embedded processors where specialized on-chip circuitry is often combined with the processor core. Support for these debug efforts is provided by an embodiment of a tracing system described below with reference to FIG. 1.

In the illustrated embodiment, tracing system 100 includes on-chip components identified as microprocessor core 110, trace generation logic (TGL) 120, trace control block (TCB) 130, and test access port (TAP) controller 140. TGL 120 can be embodied as part of microprocessor core 110. TGL 120 is generally operative to generate program counter (PC) and data trace information based on the execution of program code in one or more pipelines within microprocessor core 110. TGL 120 transmits the generated trace information to TCB 130 via trace interface 180. An embodiment of trace interface 180 is described in greater detail below.

Figure 1:
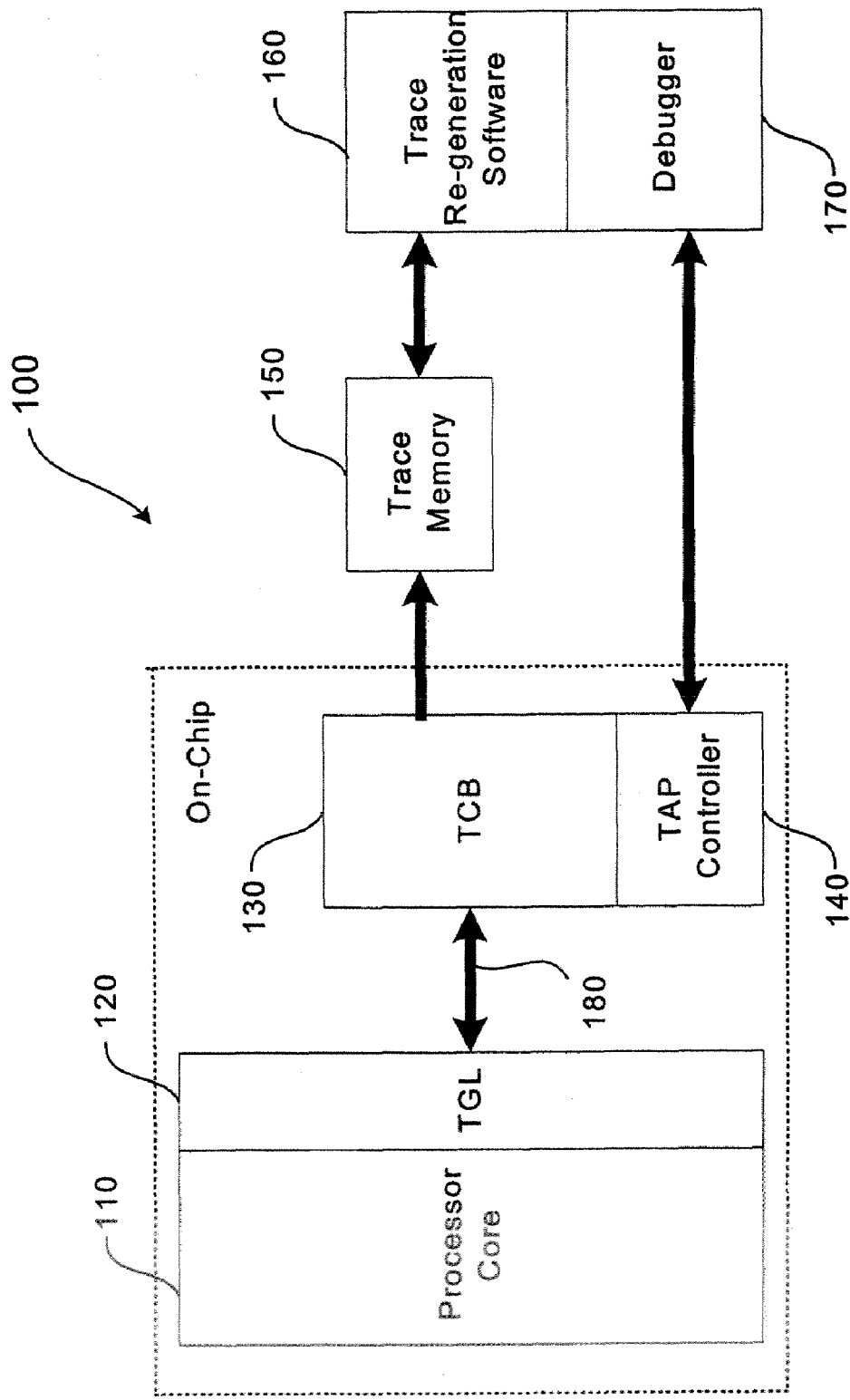
FIG. 1 illustrates a tracing system according to an embodiment of the present invention.

In the illustrated embodiment of FIG. 1, TCB 130 is located on-chip but is external to microprocessor core 110. TCB 130 captures the trace information that is provided by TGL 120 on trace interface 180 and writes the trace information to trace memory 150. The format used by TCB 130 in writing trace information to trace memory 150 is implementation dependent.

It is a feature of the present invention that the specification of trace interface 180 enables an embedded processor developer to design a customized TCB 130. The customized TCB 130 can be designed to store trace data in trace memory 150 in accordance with a particular set of requirements. For example, TCB 130 can be designed to produce trace data that is targeted for the particular needs of trace re-generation software 160.

Also included on-chip is TAP controller 140. TAP controller 140 includes instruction data, and control registers as well as circuitry that enables tap controller 140 to access internal debug registers and to monitor and control the microprocessor core's address and data buses. In one embodiment, TAP controller 140 is based on the extended JTAG (EJTAG) specification developed by MIPS Technologies, Inc.

As noted, trace memory 150 stores trace information that is received from TCB 130. In the illustrated embodiment, trace memory 150 is located off-chip. In an alternative embodiment, trace memory 150 is located on-chip. The decision of where to locate trace memory 150 can be based on user requirements such as the desired size of trace memory 150. For example, if the desired size of trace memory 150 is too large to fit on-chip, it can be located off-chip. This flexibility in design is particularly important in the embedded processor world where die size costs are significant.

The trace information stored in trace memory 150 can be retrieved through trace regeneration software 160. Trace regeneration software 160 is a post-processing software module that enables trace reconstruction. Debugger 170 is also implemented as a software module. Debugger 170 interfaces with TAP controller 140 and is generally operative to display TAP states as well as provide high-level commands to TAP controller 140. For example, debugger 170 can be used to set breakpoints or examine contents of certain sections of memory.

Having described the general components of tracing system 100, a detailed description of an embodiment of trace interface 180 is now provided. As will become apparent from the following description trace interface 180 enables increased flexibility in controlling the content and accessibility of trace data within microprocessor core 110.

In describing trace interface 180, an embodiment of a set of input and output signals from microprocessor core 110 is described. The example set of output signals are described first in the context of the transmission of trace data from TGL 120 to TCB 130. Next, the example set of input signals are described in the context of the transmission of control information from TCB 130 to TGL 120. It should be noted that in this description, the "PDO_" prefix to a signal name is used to identify signals belonging to the output interface from TGL 120, while the "PDI_" prefix to a signal name is used to identify signals belonging to the input interface to TGL 120.

In one embodiment, the set of output signals includes the signals listed in Table 1.

TABLE 1

| Output Signal Name | Description |
| --- | --- |
| PDO_IamTracing | Global enable signal for signals output from the microprocessor core |
| PDO_InsComp | Instruction completion status signal |
| PDO_AD | Trace bus for trace data |
| PDO_TType | Specifies the transmission type for the transaction on the PDO_AD lines |
| PDO_TEnd | Indicates the last cycle of the current transaction |
| PDO_TMode | Indicates the transmission mode for the bits transmitted on PDO_AD |
| PDO_LoadOrder | Indicates the out-of-order-ness of load data |
| PDO_Overflow | Indicates an internal FIFO overflow error |
| PDO_PgmOrder | Indicates the static program schedule of instructions executing in multi-pipeline cores |

The operation and content of the example set of output signals in trace interface 180 between TGL 120 and TCB 130 is described in detail below. To illustrate the protocol by which trace information generated by microprocessor core 110 can be transmitted from TGL 120 to TCB 130, reference is made to the timing diagram of FIG. 2. Timing diagram 200 generally illustrates the interaction of Pclk (processor clock used by microprocessor core 110, TGL 120 and TCB 130, PDO_InsComp[2:0], PDO_TType[2:0], PDO_TEnd, PDO_AD[15:0], PDO_TMode, and PDO_Overflow in tracing out information to TCB 130.

One of the output signals that is not illustrated in timing diagram 200 is PDO_IamTracing. This signal, sent out from TGL 120, indicates that the rest of the Out signals represent valid trace data. In effect, PDO_IamTracing represents an enable signal for the rest of the Out signals. As will be described in greater detail below, this signal can be used to support software control of the tracing process. In particular, this signal is used by TCB 130 to determine whether the trace data output by TGL 120 is valid or not valid.

Prior to describing the interaction of output signals in timing diagram 200, the usage of the PDO_InsComp[2:0] signal is first discussed. In general, PDO_InsComp[2:0] is an instruction completion status signal that can be used as an indicator of completed instructions and their type in the processor's pipeline. In one embodiment, PDO_InsComp[2:0] can take on the values of Table 2.

TABLE 2

| PDO_InsComp | Description |
| --- | --- |
| 000 | No instruction completed this cycle (NI) |
| 001 | Instruction completed this cycle (I) |
| 010 | Instruction completed this cycle was a load (IL) |
| 011 | Instruction completed this cycle was a store (IS) |
| 100 | Instruction completed this cycle was a PC sync (IPC) |
| 101 | Instruction branched this cycle (IB) |
| 110 | Instruction branched this cycle was a load (ILB) |
| 111 | Instruction branched this cycle was a store (ISB) |

Figure 3:
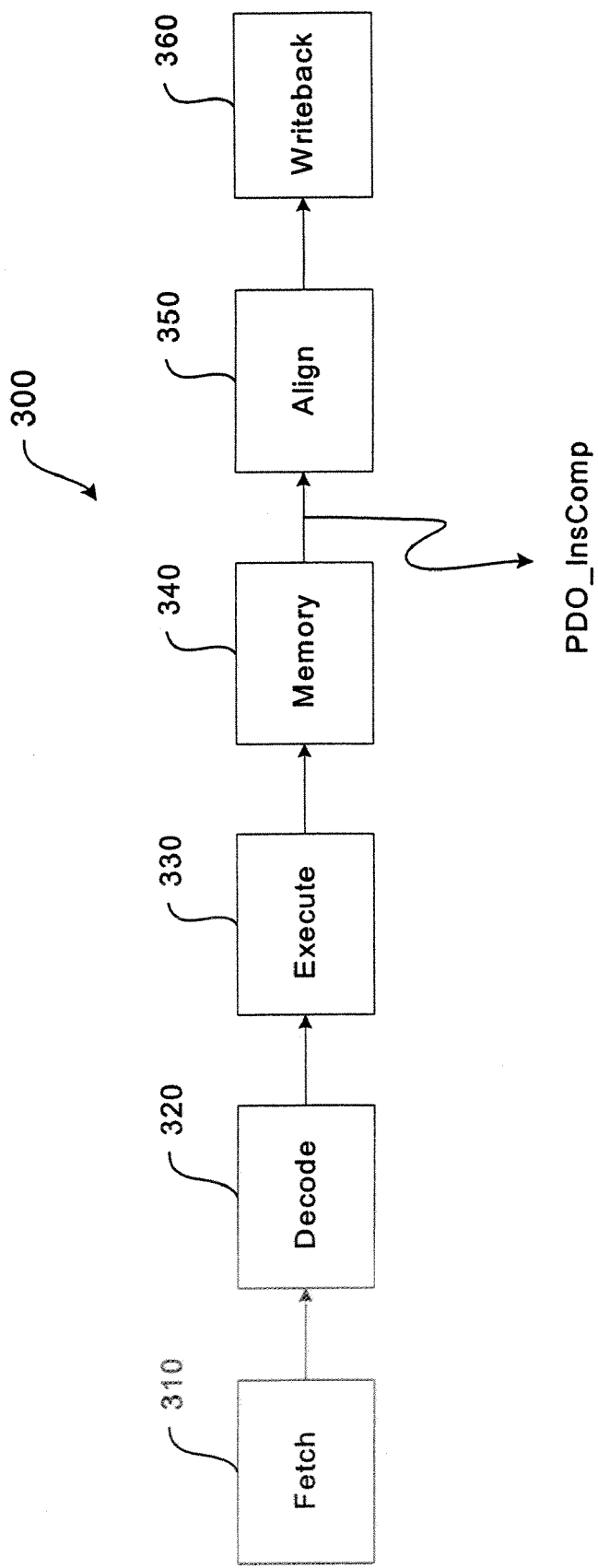
FIGS. 3 and 4 illustrate tracing output from an instruction pipeline according to an embodiment of the present invention.

It should be noted that, in one embodiment, the PDO_InsComp signal is output by TGL 120 at a point in the processor pipeline at which the instruction must complete and can no longer be killed. FIG. 3 illustrates the trace tap points in relation to the illustrated embodiment of instruction pipeline 300.

As illustrated, instruction pipeline 300 includes six stages. These six stages are labeled as fetch stage 310, decode stage 320, execute stage 330, memory stage 340, align stage 350, and writeback stage 360. As further illustrated, the PDO_InsComp signal is output after memory stage 340, the point at which the instruction should complete and can no longer be aborted. In general, the specific point at which an instruction completion signal is generated is dependent upon the particular implementation of the instruction pipeline.

Referring back to Table 2, the various values of PDO_InsComp are now described. The first PDO_InsComp value '000' is associated with a No Instruction complete (NI) indication. In one example, the NI indication can be used when the instruction pipeline is stalled. In another example, the NI indication can be used when an instruction is killed due to an exception.

The next set of PDO_InsComp values '001,' '010,' and '011' are associated with the completion of instructions within a basic block. Specifically, '001' is used to signal the completion of a regular instruction (I), '010' is used to signal the completion of a load instruction (IL), and '011' is used to signal the completion of a store instruction (IS). As the I, IL, or IS indication is associated with the completion of an instruction within a basic block, the PC value of the I, IL, or IS instruction need not be traced.

It should be noted, however, that the completion of a load instruction (IL) or a store instruction (IS) may require transmission of other information to make the tracing complete. In general, the transmission of additional information can occur in certain operating modes of the tracing process. As will be described in greater detail below, the user can direct TGL 120, using a PDI_TraceMode signal, to output one or more of the load/store addresses and data in addition to the PC value.

In this framework, when PDO_InsComp indicates a store in the completing instruction, the store address and data is also transmitted provided that the user requires those values to be traced. Similarly, when PDO_InsComp indicates a load in the completing instruction, the load address and data is also transmitted provided that the user requires those values to be traced. In general, if the load instruction hits in the cache, then the trace data for the load instruction is transmitted in a similar manner to the trace data for a store instruction.

If the load misses in the cache and must go to memory, then a different tracing process results. Regardless of whether a delay is incurred in the completion of the load instruction, the load instruction can still be indicated with the appropriate PDO_InsComp value IL and the sending of the load address. The sending of the load data, however is deferred.

Figure 4:
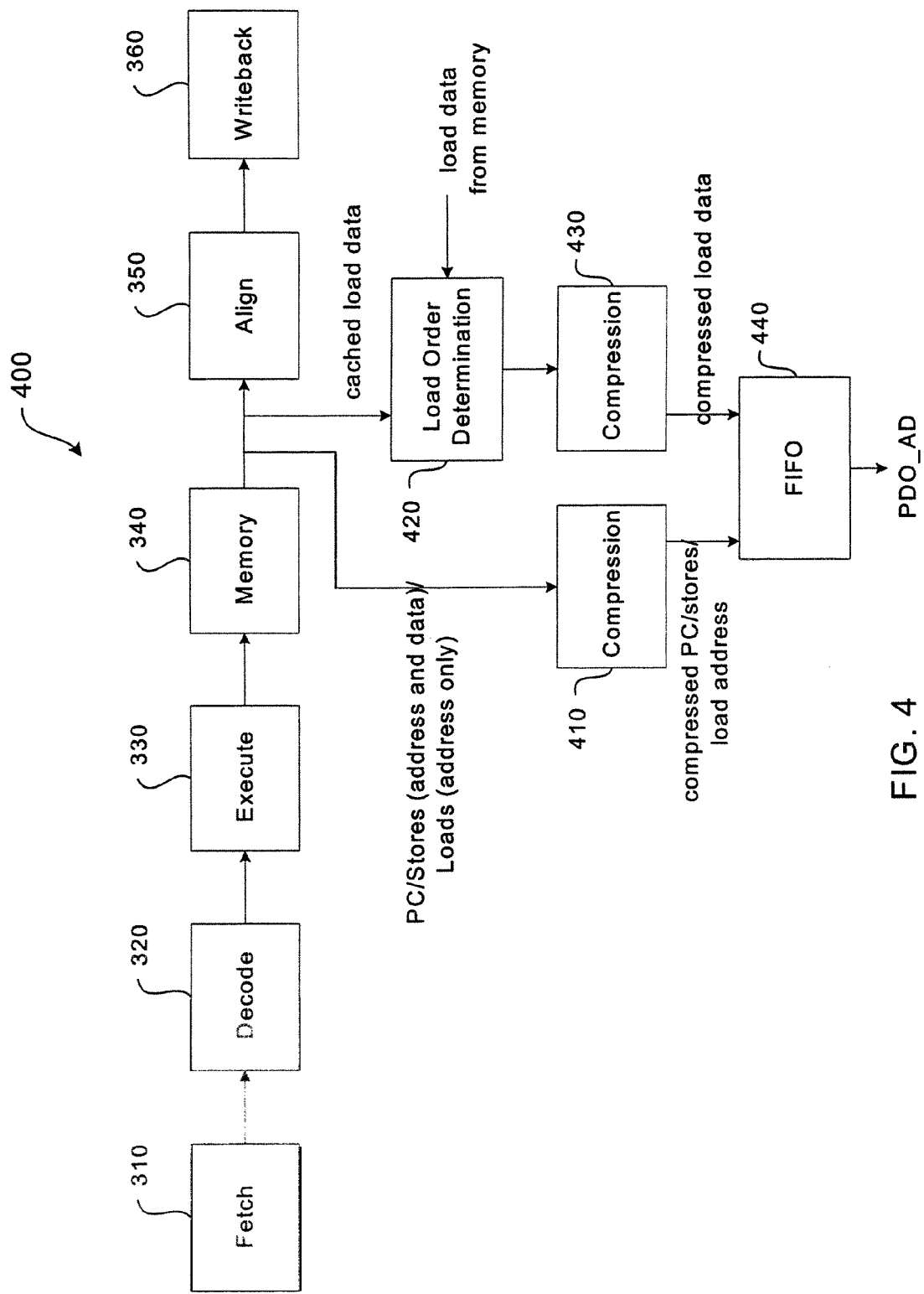

In general, tracing out load data as it becomes available avoids the need to locally save loads that hit in the cache, while waiting for earlier loads that missed in the cache to return. FIG. 4 illustrates this concept in relation to instruction pipeline 400. As noted above, the trace tap points for instruction pipeline 400 are located after memory stage 340, the point at which the instruction should complete and can no longer be killed.

In the illustrated embodiment, the PC, load address, store address, and store data are immediately provided to compression module 410. Load data, on the other hand, are provided to compression module 430 only when the load data is available to load order determination module 420.

If the load data is retrieved from cache, then the load data is immediately available to load order determination module 420. The load data can then be passed on to compression module 420. On the other hand, if the load data is requested from memory, then the load data is not immediately available to load order determination module 420. As noted above, the transmission of the load data is deferred until the load data is returned from memory.

In general, compression modules 410 and 430 are operative to compress the trace data that is to be placed into FIFO 440, thereby awaiting output onto trace bus PDO_AD. As will be described in greater detail below, compression modules 410 and 430 can be configured to dynamically select from the outputs of a plurality of compression options. This plurality of compression options can be selected to generate reasonable compression ratios for a variety of expected data inputs. It should be noted that, in one embodiment, compression modules 410 and 430 can be combined into a single compression module.

Load order determination module 420 is generally operative to coordinate the output of data that may be delayed due to cache misses. The deferred transmission of load data is enabled through the output of a PDO_LoadOrder[2:0] signal that is designed to signal the out-of-order nature of load data,In one embodiment, the PDO_LoadOrder[2:0] signal can take on the following values of Table 3.

TABLE 3

| PDO_LoadOrder | Description |
| --- | --- |
| 000 | data from oldest load instruction (is in-order) |
| 001 | data from second-oldest load instruction |
| 010 | data from third-oldest load instruction |
| 011 | data from fourth-oldest load instruction |
| 100 | data from fifth-oldest load instruction |
| 101 | data from sixth-oldest load instruction |
| 110 | data from seventh-oldest load instruction |
| 111 | data from eighth-oldest load instruction |

As noted, the PDO_LoadOrder[2:0] signal is used to indicate the out-of-order nature of data that is traced out. In operation, this signal indicates the position of the load in the list of current outstanding loads starting at the oldest. For example, assume that the program issues five loads A, B, C, D, E, respectively. Table 4 below illustrates an example of how these five loads may be traced.

TABLE 4

| Load | Cycle# | CacheOp | Load Data Available | Data Traced Out | PDO_LoadOrder |
| --- | --- | --- | --- | --- | --- |
| A | 1 | Miss | — | — | — |
| B | 2 | Hit | B | B | 001 (second oldest) |
| C | 3 | Hit | C | C | 001 (second oldest) |
| D | 4 | Miss | — | — | — |
| E | 5 | Hit | E | E | 010 (third oldest) |
| — | k | — | A | A | 000 (oldest) |
| — | k+p | — | D | D | 000 (oldest) |

For simplicity, in this example, it is assumed that the data is available the same clock cycle as the instruction. In reality, there will typically be some fixed pipeline delay from instruction issue to when the data is available from the cache after a hit.

In clock cycle 1, load A misses in the cache and goes to memory. Load A is therefore considered outstanding. In clock cycle 2, load B hits in the cache and is immediately available. Load B is then traced out with the PDO_LoadOrder signal indicating that the load data is the second oldest outstanding load. Based on the values of Table 4, the PDO_LoadOrder signal will have a value of '001.' At this point load A is considered the oldest outstanding load.

In clock cycle 3, load C hits in the cache and is immediately available. Load C is then traced out with the PDO_LoadOrder signal indicating with a value '001' that the load data is the second oldest outstanding load. At this point, load A is still considered the oldest outstanding load. Load B is not considered outstanding as it was traced out at clock cycle 2.

In clock cycle 4, load D misses in the cache and goes to memory. Load D is therefore considered outstanding. At this point, both load A and load D are the currently outstanding loads. Load A is considered the oldest outstanding load while load D is considered the second oldest outstanding load.

In clock cycle 5, load E hits in the cache and is immediately available. Load E is then traced out with the PDO_LoadOrder signal indicating with a value '010' that the load data is the third oldest outstanding load behind load A and load D.

In clock cycle k, load A returns from memory and is available. Load A is then traced out with the PDO_LoadOrder signal indicating with a value '000' that the load data is the oldest outstanding load.

Finally, in clock cycle k+p, load D returns from memory and is available. Load D is then traced out with the PDO_LoadOrder signal indicating with a value '000' that the load data is the oldest outstanding load.

In general, the use of the PDO_LoadOrder signal enables TGL 120 to avoid having to include memory for storing loads that are returned out-of-order. The loads can simply be traced out as soon as they are available. Out-of-order transfers of data are further described in co-pending application Ser. No. 09/751,747, entitled "Configurable Out-Of-Order Data Transfer in a Coprocessor Interface," which is incorporated herein by reference in its entirety.

It should be noted that in one embodiment, if the number of outstanding loads supported by the number of bits in the PDO_LoadOrder signal is exceeded, then an overflow signal is issued. The internal buffers are then cleared and tracing is restarted. If overflows are to be inhibited, then processor core 110 should be stalled until the outstanding loads are satisfied before continuing.

As described, the classification of an instruction as a load or store instruction can influence the tracing process. Additional characteristics of the instruction can also affect the tracing process. In particular, the classification of an instruction as a branch instruction can also affect the tracing process.

As noted, the I, IL, and IS instruction classifications were associated with instructions that resided within a basic block of instructions. Branch instructions, on the other hand, are associated with instructions that were the target of a taken branch, statically predictable or not.

The completion of these types of branch instructions are signaled using the PDO_InsComp values (see Table 2 above) of '101,' '110,' and '111.' Specifically, '101' is used to signal the completion of a regular branch instruction (IB), '110' is used to signal the completion of a load-branch instruction (ILB), and '111' is used to signal the completion of a store-branch instruction (ISB).

The three branch-type encodings (101, 110, and 111) imply that the associated instruction was the target of a taken branch it should be noted, however, that the branch-type encoding can also be used when an exception is taken and when a return from exception happens since both change the PC value in an unpredictable way.

In general, a branch is indicated on the first instruction in a new basic block. When this first instruction is either a load or a store, then the PDO_InsComp signal takes values ILB or ISB, respectively, to indicate the combined condition of a branch and a load or store.

As noted, some completing instructions transmit other information to make the tracing complete. For example, if the branch was unpredictable and the unpredictability lies in the branch target address, then the PC value should be transmitted. If the unpredictability lies in the branch condition (i.e., determining if the branch is taken or not), on the other hand, then the branch target PC value need not be transmitted. Here, it is sufficient to simply indicate that the branch was taken.

For ISB and ILB indications, the user may require that the target address and/or data be traced along with the transmitted PC value. In particular, for an ISB indication, the PC value is sent first, followed by the store address, and finally the store data. For an ILB indication, the PC value and load address are sent first, followed by the load data when it becomes available.

In general, the tracing of the PC value is important where the PC value could not be statically predicted. Without this information, trace regeneration software 160 is unable to reconstruct the program execution path.

In the present invention, the program trace reconstruction efforts are assisted through the periodic transmission of a PC value. This periodic transmission of the PC value enables trace regeneration software 160 to resynchronize itself to the program trace. Trace regeneration software 160 may require resynchronization in situations where trace information is lost (e.g., trace FIFO overflow). The transmission of general synchronization information beyond the PC value is described in greater detail below.

The periodic transmission of the PC value is signaled using a PDO_InsComp signal value of '100,' which is associated with a PC sync (IPC) indication (see Table 2). The periodic output of the full PC value enables trace regeneration software 160 to resynchronize itself with the output PC trace and the static program code. This full PC value is output approximately every synchronization period as defined by the user. In one embodiment, TGL 120 will ensure that the synchronization signal does not happen on an unpredictable branch, load, or store instruction. The operation and control of the synchronization signal feature is described in greater detail below.

Figure 2:
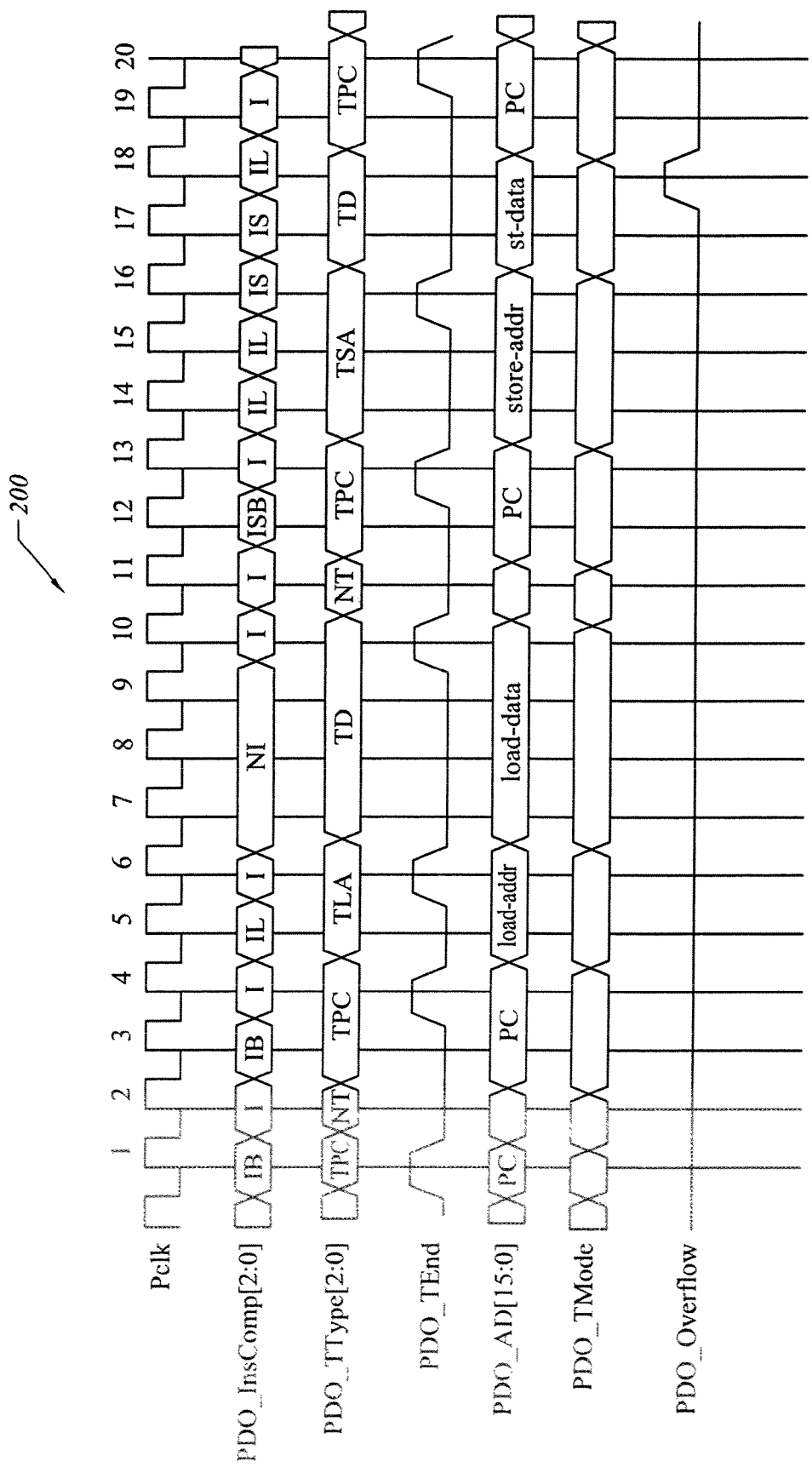
FIG. 2 illustrates a timing diagram of tracing signals

Having defined the various values of the PDO_InsComp signal, the output tracing process is now explained through the example of timing diagram 200 of FIG. 2. Timing diagram 200 illustrates the PDO_InsComp[2:0] signal relative to Pclk. At clock cycle 1, PDO_InsComp[2:0] has a value IB, indicating the completion of a branch instruction. In the following description, the output signals are frequently described with respect to their indication as opposed to their bit values. For example, the PDO_InsComp[2:0] signal bit value '101' is also referred to by its IB value indication.

The value IB represents the completion of an instruction that could not be statically predicted. Accordingly, the PC value for the branch instruction should be traced, thereby enabling trace regeneration software 160 to recreate the execution of a new block of instructions.

The PC value for the branch instruction is transmitted on the trace bus PDO_AD[15:0]. In general, when a PC change, load/store address, or load/store data information needs to be traced, these pieces of trace information are all sent out on the same PDO_AD trace bus. In general, the width of the PDO_AD trace bus is implementation dependent. In one embodiment, the trace bus PDO_AD is configured to be 32-bits wide.

In general, since the width of the PDO_AD trace bus may not be adequate to transmit the entire address or data in one cycle, each transaction may take multiple cycles to transmit. A FIFO (illustrated as element 440 in FIG. 4) is therefore used to hold pending transactions and values. In one embodiment, if a transaction takes multiple cycles, then the least-significant bits are sent first, followed by the more-significant bits. When only a byte of data is sent, it is transmitted on the least-significant bits. In general, there is no need to indicate the validity since the post-analyzing software knows that the associated instruction is a load or store byte, and hence, will only look at the lower 8 bits of a 16-bit bus.

Distinguishing between the types of trace data that are transmitted on the PDO_AD trace bus is accomplished using the PDO_TType[2:0] signal. The PDO_TType[2:0] signal is used to indicate the type of information being transmitted on the PDO_AD bus, In one embodiment, the PDO_TType[2:0] signal can take on the values of Table 5.

TABLE 5

| PDO_TType | Description |
| --- | --- |
| 000 | No transmission this cycle (NT) |
| 001 | Begin transmitting the PC (TPC) |
| 010 | Begin transmitting the load address (TLA) |
| 011 | Begin transmitting the store address (TSA) |
| 100 | Begin transmitting the data value (TD) |
| 101 | Begin transmitting the processor mode and the 8-bit ASID value (TMOAS) |
| 110 | Begin user-defined trace record - type 1 (TU1) |
| 111 | Begin user-defined trace record - type 2 (TU2) |

As illustrated in Table 5, various data types can be output on trace bus PDO_AD. A first set of trace data includes PC values (TPC), load address values (TLA), store address values (TSA) and data values (TD). These trace data types are identified using the PDO_TType signal values of '001' to '100,' respectively.

Additional trace data beyond PC, address and data values can also be transmitted on trace bus PDO_AD, Specifically, PDO_TType signal value '101' is used to identify the transmission of processor mode and application space identity (ASID) information. As will be described in greater detail below, the processor mode and ASID information can be included as part of the synchronization information that is periodically transmitted. This portion of the synchronization information enables trace regeneration software 160 to identify the software state of the computer system being traced.

The final data types that can be transmitted on trace bus PDO_AD are user-defined trace records TU1 and TU2. These user-defined trace records are identified using PDO_TType signal values '110' and '111,' respectively. The use of user-defined trace records is described in greater detail below.

In general, the types of trace data that are transmitted on the trace bus PDO_AD is dependent upon the type of instruction that has completed. As noted, for instructions (I) within a block, a PC value need not be transmitted. For load instructions (IL) or store instructions (IS) within a block, however, a user may decide to trace the target address and data.

For branch instructions where there is a jump in PC, several options exist. In one embodiment, the following rules can be applied: (1) when the branch is unconditional and the branch target is predictable, IB, ILB, or ISB is used for the PDO_InsComp value, and the PC value is not traced out; (2) when the branch is conditional, and the branch target is predictable, IB, ILB, or ISB is used only when the branch is taken and there is no need to trace out the PC value; and (3) when the branch is conditional or unconditional, and the branch target is unpredictable, IB, ILB, or ISB is used and the PC value is traced out using TPC for the PDO_TraceType signal.

As an example, the PC value can be transmitted (a) after a JR or JALR instruction; (b) after a control transfer to an exception handler; (c) after a return from exception (ERET or DERET instruction); and (d) for resynchronization purposes.

Returning to timing diagram 200 of FIG. 2, the PC value is transmitted at clock cycle 1 on bus PDO_AD[15:0] upon the signaling of an IB signal on PDO_InsComp[2:0]. The type of data that is transmitted on trace bus PDO_AD[15:0] is made known to TCB 130 through the transmission of the TPC value on PDO_TType[2:0].

The transmission of the PC value on PDO_AD[15:0] requires one clock cycle. Accordingly, the PDO_TEnd signal is asserted on clock cycle 1. Generally, the PDO_TEnd signal indicates the last cycle of the current transaction on trace bus PDO_AD[15:0]. This signal can be asserted in the same cycle that a transaction is started implying that the particular transaction only took one cycle to complete.

As illustrated in FIG. 2, timing diagram 200 also includes a PDO_TMode signal. The PDO_TMode signal indicates the transmission mode for the bits transmitted on trace bus PDO_AD[15:0]. As will be described in greater detail below, various types of data compression can be applied to the particular types of trace data. For example, a delta value can be used for the transmission of sequential PC values. Delta compression, however, may not be appropriate to the transmission of data values since those values are unlikely to be sequentially related. For those values, a form of bit-block compression may be more appropriate.

In accordance with the present invention, the PDO_TMode signal can be used to signal to TCB 130 the type of compression that has been performed on the trace data that is transmitted on trace bus PDO_AD[15:0]. This mode information is therefore used by TCB 130 to regenerate the program flow accurately.

As noted the types of available compression options can be dependent on the trace data type indicated by the PDO_TType signal. Accordingly in one embodiment, the PDO_TMode signal can have values that are dependent or the PDO_TType signal value, In an alternative embodiment, the PDO_TMode signal has values that are independent of the PDO_TType signal value. In other words, regardless of the type of trace data that is being transmitted, the PDO_TMode will have a value that identifies one of a plurality of eligible compression options. In timing diagram 200, the PDO_TMode signal is left unspecified.

At clock cycle 2, PDO_InsComp[2:0] has a value I, indicating the completion of an instruction within a block of instructions. As noted, the completion of an instruction within a block does not require the tracing of the PC value. Accordingly, no transmission occurs on trace bus PDO_AD[15:0]. The no transmission state is also signaled by the PDO_TType signal with a NT value.

At clock cycle 3, PDO_InsComp[2:0] has a value IB, indicating the completion of another branch instruction. The PC value is then transmitted on trace bus PDO_AD[15:0] with the data type TPC indicated on PDO_TType[2:0]. As illustrated, the transmission of the PC value requires two clock cycles (3 and 4). Accordingly, the PDO_TEnd signal is not asserted until the end of the transaction at clock cycle 4. Also occurring at clock cycle 4 is the signaling of value I on PDO_InsComp[2:0]. This indicates the completion of an instruction within a block of instructions and no transmission on trace bus PDO_AD[15:0] is required.

At clock cycle 5, PDO_InsComp[2:0] has a value IL, indicating the completion of a load instruction. Here, the PC value need not be transmitted. The user can specify, however, that the load address and data be traced. With the assumption that the load hit in the cache, the load address and data is immediately available. The load address is transmitted first on PDO_AD[15:0] at clock cycles 5 and 6 and the load data is transmitted next on PDO_AD[15:0] at clock cycles 7-10. In both cases, the corresponding data type is transmitted on PDO_TType[2:0] using signal values TLA and TD, respectively, During the load address and data transmission at clock cycles 5-10, PDO_InsComp[2:0] further signals the completion of IL at clock cycle 5, I at clock cycle 6, NI at clock cycles 7-9, and I at clock cycle 10. Each of these instruction-completion indications did not require a transmission on trace bus PDO_AD[15:0]. Accordingly, the trace data FIFO did not overflow as it waited to be cleared during the six-cycle transmission of the load address and data during clock cycles 5-10.

Timing diagram 200 illustrates an overflow condition at clock cycle 18. The overflow indication is indicated by the assertion of the PDO_Overflow signal, thereby indicating an internal FIFO overflow error. As noted earlier, FIFO 440 is used to hold values to be transmitted that do not fit within a single cycle of transmission.

In a FIFO overflow condition, TGL 120 indicates using the PDO_Overflow signal that the current tracing is being abandoned due to a FIFO overflow. In this situation, TGL 120 discards all entries in FIFO 440, and restarts transmission from the next completed instruction. It should be noted that the first instruction to be signaled after the assertion of the PDO_Overflow signal should have its PC value sent as well. In effect, that instruction is treated as a IB, ILB, or ISB instruction.

In timing diagram 200, the internal FIFO overflow error can be attributed to the build up of trace data due to the activity in clock cycles 12-18. At clock cycle 12, PDO_InsComp[2:0] indicates completion of a branch store instruction ISB, The PC value, store address, and store data are then transmitted on trace bus PDO_AD[15:0] at clock cycles 12-13, 14-16, and 17-18, respectively. As the trace data for the ISB indication completes, however, PDO_InsComp[2:0] continues to indicate the completion of additional instructions. Specifically, PDO_InsComp[2:0] indicates the sequential completion of I, IL, IL, IS, IS, and IL instructions at clock cycles 13-18, respectively.

While the completion of instruction I at clock cycle 13 does not require tracing of any data, the completion of the IL and IS instructions on each of clock cycles 14-18 can require tracing of a target address and data. Each of these pieces of trace data continues to fill FIFO 440 as the trace data associated with the ISB instruction at clock cycle 12 completes its transmission on trace bus PDO_AD. FIFO 440 therefore eventually overflows, as shown at clock cycle 18, indicating that FIFO 440 is being filled faster than it is being emptied. It should be noted that when the PDO_Overflow signal is asserted, the values of the other output signals can be disregarded. Accordingly, the PDO_TEnd signal need not be asserted at clock cycle 18.

Upon a FIFO overflow condition, the next instruction to be signaled is treated as an IB, ILB, or ISB instruction. That is, the next instruction to be signaled is treated as if it was the start of a new block of instructions. In timing diagram 200, this effect is seen in the I instruction at clock cycle 19. If the I instruction appeared within a block that was being traced, then the PC value does not have to be traced. In this case, however, the PC value is traced on the trace bus PDO_AD [15:0] because it occurred after the assertion of the overflow signal on PDO_Overflow.

It should be noted that it is possible for the entire program trace to be captured under all circumstances, Trace records need not be lost. Maintaining the integrity of the entire program trace can be accomplished using an inhibit overflow signal PDI_InhibitOverflow.

When the PDI_InhibitOverflow signal is asserted, this implies that microprocessor core 110 should stall the instruction pipeline without overflowing FIFO 440. Thus, if the PDI_InhibitOverflow signal is asserted, the PDO_Overflow signal will not be asserted. The instruction pipeline is restarted as soon as FIFO 440 starts emptying again.

The above description has thus far been focused on the tracing of data for a single instruction pipeline. In accordance with the present invention, the tracing functionality described above can also be supported for a microprocessor core 110 that supports tracing of instructions executed by multiple instruction pipelines.

With multiple instruction pipelines, the tracing of instructions from each instruction pipeline is coordinated so that the instructions that are issued together are also traced out together. To trace instructions out together, TGL 120 should hold instructions that complete earlier than other instructions that were part of the same group of instructions that were issued together.

It should be noted that if microprocessor core 110 implements multiple instruction pipelines, then the "Out" signals are duplicated as many times as there are instruction pipelines within microprocessor core 110. For convenience, the signal names described below have a "_n" appended to the signal name. Here, "n" is used to designate a pre-determined pipeline number. For example, a microprocessor core with two integer pipelines may use the signals PDO_InsComnp_0 and PDO_InsComp_1 to represent the instruction completion information from each respective pipeline.

In accordance with the present invention, TGL 120 tags instructions from the same issue cycle. These tagged instructions are held by TGL 120 until all of the instructions in the issue group are either completed or are known to not complete (e.g., exception). The group of instructions can then be traced out together using another "Out" signal, PDO_PgmOrder[2:0]. In one embodiment, TGL 120 includes an extra buffer whose depth is dependent on the instruction pipeline depths.

In general, the program order signal PDO_PgmOrder[2:0] is used to indicate the static schedule of an instruction in a pipeline with respect to instructions in other pipelines. When multiple instruction pipelines are supported, the PDO_PgmOrder[2:0] signal is provided from TGL 120 to TCB 130. When multiple instruction pipelines are not supported, this signal can be omitted or tied off otherwise.

The three bits of the PDO_PgmOrder[2:0] signal allows for up to eight instruction pipelines to be used. Additional bits can also be used to support additional instruction pipelines.

In one embodiment, a PDO_PgmOrder[2:0] value of 0 indicates that the instruction is the earliest in the static program image, a PDO_PgmOrder[2:0] value of 1 indicates that the instruction is the second earliest in the static program image, and so on. The last instruction is the one with the highest value.

Figure 5:
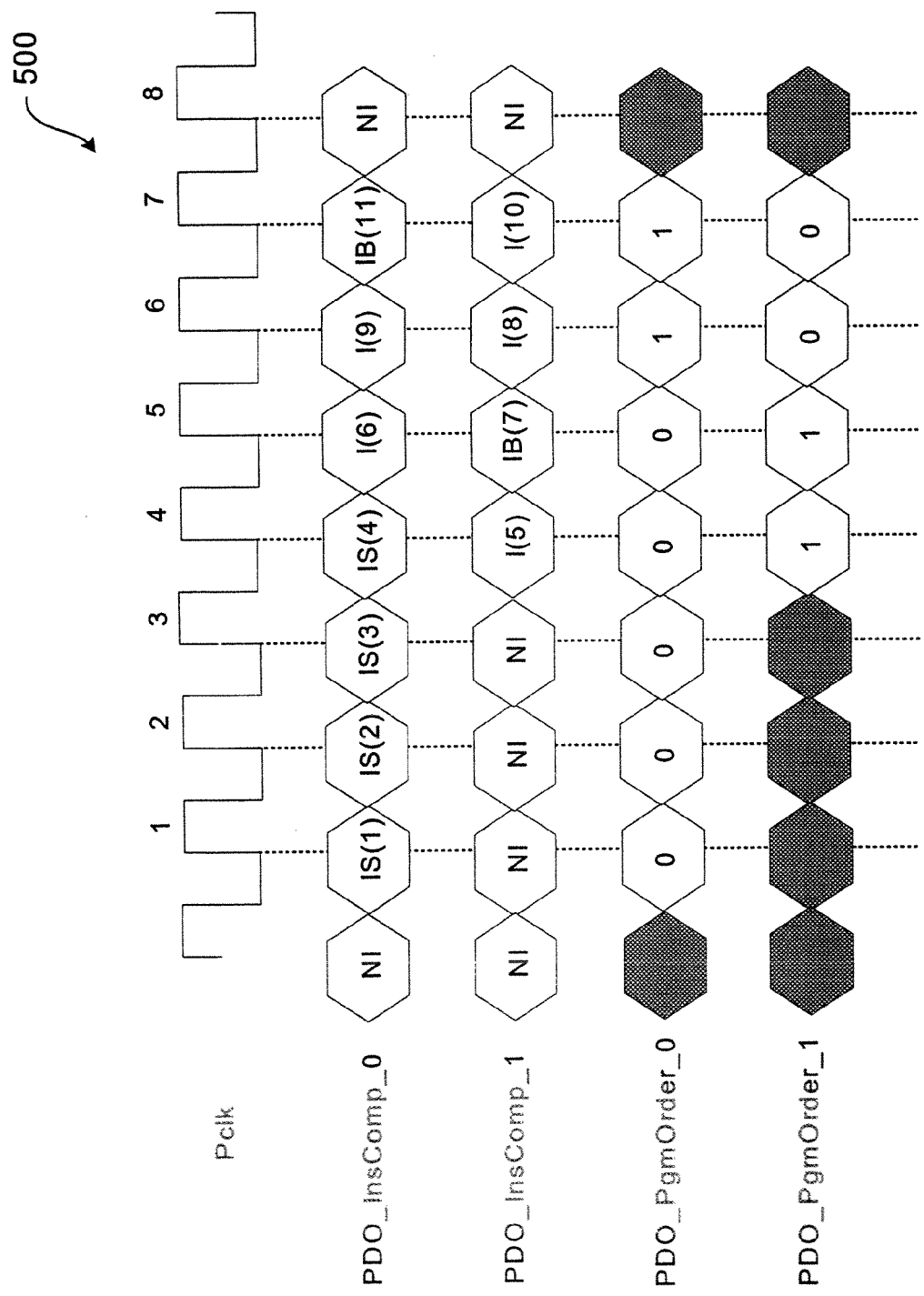
FIG. 5 illustrates a timing diagram of tracing signals from multiple instruction pipelines.

To illustrate the use of the PDO_PgmOrder[2:0] signal, reference is made to the assembly fragment in Table 6 and the timing diagram of FIG. 5.

TABLE 6

| Cycle No. | Inst. No. | PC | Instruction | Pipe # |
|---|---|---|---|---|
| 1 | 1 | 0x00400188 | SW a2/$6, 0xe170($at/$1) | 0 |
| 2 | 2 | 0x0040018c | SW a0/$4, 0xb134(gp/$28) | 0 |
| 3 | 3 | 0x00400190 | SW a1/$5, 0xb130(gp/$28) | 0 |
| 4 | 4 | 0x00400194 | SW r0/$0, 0x1c(sp/$29) | 0 |
|   | 5 | 0x00400198 | JAL 0x418d9c | 1 |
| 5 | 6 | 0x0040019c | OR s8/$30, r0/$0, r0/$0 | 0 |
|   | 7 | 0x00418d9c | NOP | 1 |
| 6 | 8 | 0x00418da0 | JR ra/$31 | 1 |
|   | 9 | 0x00418da4 | NOP | 0 |
| 7 | 10 | 0x004001a0 | JAL 0x411c40 | 1 |
|   | 11 | 0x004001a4 | NOP | 0 |

Table 6 illustrates an example of the execution of an assembly fragment in an environment that includes a dual-issue microprocessor core. The assembly fragment is listed in Table 6 based on its PC and Instruction values. For simplicity, the instructions in the assembly fragment are also identified by an instruction number (Inst. No.). The instruction number values are used to identify instruction execution in timing diagram 500 of FIG. 5.

In the dual-issue microprocessor core of the present example, the two instruction pipelines are referred to as instruction pipeline 0 and instruction pipeline 1. Here, it is assumed that instruction pipeline 0 is configured to execute load/store/operate instructions, while instruction pipeline 1 is configured to execute branch/jump/operate instructions, Based upon this assumption, the instructions in the code fragment of Table 6 can be assigned to a particular instruction pipeline for execution.

As illustrated, instructions 1-4 are each store instructions. In our example framework, these instructions can only be executed by instruction pipeline 0. Accordingly, instructions 1-4 are sequentially assigned to instruction pipeline 0 in clock cycles 1-4, respectively. Instruction pipeline 1 is not utilized until one of a branch/jump/operate instruction is executed.

As illustrated in Table 6, instruction pipeline 1 is first utilized at clock cycle 4. At clock cycle 4, store instruction number 4 is executed by instruction pipeline 0, while jump instruction 5 is executed by instruction pipeline 1. As further illustrated, both instruction pipelines are utilized at clock cycles 5-7. Specifically, at clock cycle 5, OR instruction 6 is executed by instruction pipeline 0 and NOP instruction 7 is executed by instruction pipeline 1; at clock cycle 6, jump instruction 8 is executed by instruction pipeline 1 and NOP instruction 9 is executed by instruction pipeline 0; and at clock cycle 7, jump instruction 10 is executed by instruction pipeline 1 and NOP instruction 11 is executed by instruction pipeline 0.

As illustrated, both of the instruction pipelines in the microprocessor core are used in clock cycles 4-7 to execute instructions 4-11. To indicate the static schedule of an instruction in instruction pipeline 0 relative to an instruction in instruction pipeline 15 the PDO_PgmOrder_n signal is used. The PDO_PgmOrder_n signal is an order signal that indicates the order of the instruction in that issue group relative to the other instructions.

It should be noted that the addition of the PDO_PgmOrder_n signal is by itself not sufficient to enable an accurate determination of the static program order. This results since each instruction can spend a different amount of time in each instruction pipeline. In accordance with the present invention, TGL 120 holds all of the early completing instructions in a group of instructions that have been issued together, and then traces the group of instructions out together in the same cycle with the appropriate PDO_PgmOrder_n signal. This additional order signal enables trace regeneration software 160 to reconstruct the program execution correctly.

To illustrate the usage of the PDO_PgmOrder_n signal, reference is made to timing diagram 500 of FIG. 5. Timing diagram 500 illustrates the instruction completion signals PDO_InsComp_0 and PDO_InsComp_1 relative to the program order signals PDO_PgmOrder_0 and PDO-PgmOrder_1 for the assembly fragment of Table 6. Both the PDO_InsComp_0 and PDO_InsComp_1 signals operate in the manner described above. Each of these instruction completion signals identifies the instruction that completes in a particular cycle on that particular instruction pipeline. For convenience, the instruction completion signals of timing diagram 500 are labeled with an instruction number in addition to the code for the type of instruction (e.g., I, IL, IS, etc.).

At clock cycles 1-3, the PDO_InsComp_0 signal indicates the completion of instructions 1-3 respectively. As described above each of instructions 1-3 represent a store instruction (IS). At clock cycle 4, both the PDO_InsComp_0 signal and the PDO_InsComp_1 signal indicate the completion of an instruction. Specifically, PDO_InsComp_0 signals the completion of instruction 4, while PDO-InsComp_1 signals the completion of instruction 5.

Significantly, the usage of the PDO_InsComp_n signals identify the completion of instructions 4 and 5 at clock cycle 4 does not provide any indication of the static program order of instruction 4 relative to instruction 5. Instead, the PDO_PgmOrder_n signals are used to identify the static program schedule. At clock cycle 4, the PDO_PgmOrder_0 signal identifies the first instruction in the issue group with a "0," while the PDO_PgmOrder_1 signal identifies the second instruction in the issue group with a "1."

As further illustrated in timing diagram 500, the relative static program ordering between instructions in instruction pipeline 0 and instruction pipeline 1 is reversed at clock cycle 6. Here, the PDO_InsComp_0 signal indicates the completion of instruction 9, while the PDO_InsComp_1 signal indicates the completion of instruction 8. As instruction 9 follows instruction 8 in the static program schedule, the PDO_PgmOrder_0 signal identifies the second instruction in the issue group with a "1," while the PDO_PgmOrder_1 signal identifies the first instruction in the issue group with a "0."

As thus described, the PDO_PgmOrder_n signal enables the tracing of instructions from multiple instruction pipelines to be coordinated. Instructions that are issued together can therefore be traced out together. As noted, instructions from an issue group that complete earlier are held until all of the instructions in the issue group either complete or are squashed, At that point, the instructions in the issue group can be traced out using the PDO_PgmOrder_n signal.

Having described an example set of output signals used to transmit trace data from TGL 120 to TCB 130, various controls of the output tracing process are now described. In one embodiment, the controls of the output tracing process are effected through a set of "In" signals that are transmitted from TCB 130 to TGL 120. As noted above, these "In" signals are identified using the "PDI_" prefix.

In one embodiment, the set of input signals includes the example set of signals listed in Table 7. This set of "In" signals provides various controls over the tracing process.

TABLE 7

| Input Signal Name | Description |
| --- | --- |
| PDI_TraceOn | This signal specifies whether tracing is globally turned on or off |
| PDI_TraceMode | If PDI_TraceOn is asserted or a hardware breakpoint triggers trace on, this signal indicates what is to be traced by the core. In one embodiment, this signal can include the following values:<br>000: Trace PC<br>001: Trace PC and load address<br>010: Trace PC and store address<br>011: Trace PC and both load/store addresses<br>100: Trace PC and load address and data<br>101: Trace PC and store address and data<br>110: Trace PC and both load/store address and data<br>111: Trace PC and load data |
| PDI_G | If this bit is set, implies that all processes are to be traced. If this bit is not set, then trace data is sent only for a process that matches the PDI_ASID[7:0] lines. |
| PDI_ASID[7:0] | This signal indicates to the TGL which application space identity (ASID) should trigger trace information. |
| PDI_U | This bit enables tracing in User Mode. This enables tracing if PDI_TraceOn is also asserted or the hardware breakpoint trace triggers on, and either the PDI_G bit is set or the PDI_ASID matches the current process ASID. |
| PDI_K | This bit enables tracing in Kernel Mode. This enables tracing if the PDI_TraceOn is also asserted or the hardware breakpoint trace triggers on, and either the PDI_G bit is set or the PDI_ASID matches the current process ASID. |

TABLE 7-continued

| Input Signal Name | Description |
| --- | --- |
| PDI_S | This bit enables tracing in Supervisor Mode. This enables tracing if PDI_TraceOn is also asserted or the hardware breakpoint trace triggers on, and either the PDI_G bit is set or the PDI_ASID matches the current process ASID. |
| PDI_EXL | This bit enables tracing when the EXL (exception level) bit in the Status register is one or when the ERL (error level) bit in the Status register is one. This enables tracing only if PDI_TraceOn is also asserted or the hardware breakpoint trace triggers on, and either the PDI_G bit is set or the PDI_ASID matches the current process ASID. |
| PDI_DM | This bit enables tracing in debug mode (i.e., when the DM bit is one in the Debug register). |
| PDI_InhibitOverflow | This signal indicate that the pipeline should be back-pressured (and stalled) instead of allowing the trace FIFO to overflow. |
| PDI_StallSending | This signal indicates to the core that it must stop transmitting trace information. This request may be important when the TCB is in danger of over-running its internal trace buffer. When this signal is asserted, the core may have to stall the pipeline. |
| PDI_SyncOffEn | This signal is an enable signal for the PDI_SyncPeriod and PDI_OffChipTB signals. |
| PDI_SyncPeriod | This signal is used to set the synchronization period. |
| PDI_OffChipTB | This signal indicates that the trace data is being sent off-chip to an external trace memory. When this signal is not asserted, it indicates an on-chip trace buffer. |

The PDI_TraceMode[2:0] signal is used to control the tape of information that is to be traced out. In effect, the PDI_TraceMode[2:0] signal can be used to limit the e amount of data that is traced out to TCB 130. For example, trace data can be limited to the PC value using a PDI_TraceMode[2:0] signal value of '000.' Alternatively, the data to be traced can be extended to include one or more of the load/store address and data. The specific set of data to be traced can be specified using PDI_TraceMode[2:0] signal values of '001' to '111.' In general, while the limitation on the types of trace data to be output reduces the visibility into the operation of microprocessor core 110, it also reduces the likelihood of an overflow in trace FIFO 440 as trace data is accumulated by TGL 120.

As noted above, a FIFO overflow can be prevented by back-pressuring and stalling the instruction pipeline. This action, however, serves to reduce the operational speed of the execution of the code by microprocessor core 110, thereby increasing the debugging time. As illustrated in Table 7, the input signal PDI_InhibitOverflow can be used to signal to TGL 120 that a FIFO overflow should be prevented.

Microprocessor core 110 may also be instructed to stall the instruction pipeline if TCB 130 is in danger of over-running its internal trace buffer. Here, the PDI_StallSending signal indicates to TGL 120 that it should stop transmitting trace information. When this signal is asserted, microprocessor core 110 may have to stall the instruction pipeline.

In addition to controlling the types of information that are being traced out, input signals can also be used to control when tracing is initiated. In one embodiment, tracing can be initiated based upon the operating mode of microprocessor core 110. Triggering tracing based upon the operating mode of microprocessor core 110 can be advantageous when a user is attempting to debug an operating system interacting with a user program. Conventionally, this debugging process can be accomplished by triggering tracing using breakpoints for each kernel entry. This methodology represents an intensive time-consuming task.

Alternatively, it is far easier to inhibit tracing when microprocessor core 110 is operating in user mode, while triggering tracing on when microprocessor core 110 enters kernel mode. The flexibility of initiating and/or inhibiting tracing based on the operating mode of the processor enables increased functionality in the design and implementation of a debugging objective.

In the present description, the term "processor mode" generally refers to an operational characteristic of the microprocessor. In one example, a set of processor modes can be defined relative to privilege levels to system resources. The specific processor modes defined for a microprocessor can be implementation dependent.

In one embodiment, the processor modes of microprocessor core 110 include a kernel mode, a supervisor mode, and a user mode. Kernel mode represents a highest system privilege. In kernel mode, registers can be accessed and changed. The innermost core of the operating system runs in kernel mode. Supervisor mode has fewer privileges then kernel mode and is used for less critical sections of the operating system. Finally, user mode has the lowest system privilege. User mode is designed to prevent users from interfering with one another. For each of the kernel, supervisor, and user modes, access privileges to the virtual address space can be defined. In one embodiment, the accessibility and mapping of segments in the virtual address spaces is defined as set forth in the MIPS32™ and MIPS64™ architecture specifications.

As illustrated in Table 7, mode-based tracing for kernel mode, supervisor mode, and user mode can be enabled using input signals PDI_K, PDI_S, and PDI_U, respectively. These input signals enable a debug operation to trigger or inhibit tracing based upon the entry or exit from one or more of the processor modes, For example, if the input signal PDI_K is asserted and PDO_U is not asserted, then tracing is triggered when microprocessor core 110 enters kernel mode from user mode. If input signal PDO_U is asserted, then tracing continues during the transition from user mode to kernel mode. In general, the flexibility in designing an effective debugging mechanism is enhanced through the selective triggering of mode-based tracing.

In addition to the mode-based controls, tracing can also be triggered based upon the identification of particular processes. In a multi-tasking system, each task or process has its own ASID value. The ASID value can be used in the debugging process to identify particular processes that need to be debugged.

As illustrated in Table 7, the input signal PDI_G is used to globally enable tracing for all running processes. If this bit is not set, then trace data is sent only for a process having an ASID value that matches the value of the PDI_[7:0] signal. In other words, the PDI_ASID[7:0] signal identifies to TGL 120 which ASID should trigger the output of trace information. As noted, this functionality is useful to assist in the debugging of specific problematic processes.

As noted, there are several input signals such as PDI_TraceOn, PDI_G, PDI_ASID, PDI_U, PDI_K, PDI_S, PDI_EXL, and PDI_DM that enable tracing in various modes. In one embodiment, tracing is triggered on when the following expression is true. In the following expression, "&&" is used as a logical AND, "||" is used as a logical OR, and "==" is used as an EQUALS TO condition evaluation.
(PDI_TraceOn) &&
(PDI_G||(PDI_ASID==current_process_ASID))&&
((PDI_U && user_mode)||(PDI_K && kernel_mode)||
 (PDI_S && supervisor_mode)||
(PDI_X && EXL_is_one_or_ERL_is_one)||(PDI_DM && debug_mode))

One of the primary goals of the debugging process is to reconstruct the dynamic execution path of the program. Accurate trace reconstruction can often be achieved through the provision to trace reconstruction software 160 of the PC value at the head of each basic block. In some situations, however, trace reconstruction will be disrupted due to the absence of trace information. For example, trace information may be lost if FIFO 440 in TGL 120 overflows, thereby causing TGL 120 to empty FIFO 440 before reinitiating the tracing process.

To enable trace regeneration software 160 to re-synchronize itself with the program execution, synchronization information is output at predictable intervals, approximately every synchronization period. This synchronization period is set through the use of the PDI_SyncPeriod[2:0] signal. In one embodiment, the PDI_SyncPeriod[2:0] signal takes on the values of Table 8.

TABLE 8

| PDI_SyncPeriod | On-Chip Trace Memory | Off-Chip Trace Memory |
|---|---|---|
| 000 | $2^2$ | $2^7$ |
| 001 | $2^3$ | $2^8$ |
| 010 | $2^4$ | $2^9$ |
| 011 | $2^5$ | $2^{10}$ |
| 100 | $2^6$ | $2^{11}$ |
| 101 | $2^7$ | $2^{12}$ |
| 110 | $2^8$ | $2^{13}$ |
| 111 | $2^9$ | $2^{14}$ |

As illustrated in Table 8, the synchronization period can be dependent upon the implementation of trace memory 150 (see FIG. 1). As noted, trace memory 150 can be located either on-chip or off-chip. On-chip trace memory is typically smaller than off-chip trace memory. In one example, on-chip trace memory ranges from 64 bytes to 4 kbytes, while off-chip trace memory can be sized in excess of 64 kbytes.

Regardless of the size of trace memory 150, it is desirable to have multiple instances of the synchronization information to be stored in trace memory 150. This ensures that in the process of writing trace data to trace memory 150, all instances of the synchronization information will not be eliminated when portions of trace memory 150 are overwritten. Thus, in one embodiment, the synchronization period is selected such that, for a particular size of trace memory 150, N (e.g., 4) instances of synchronization information are expected to exist in trace memory 150.

It is a feature of the present invention that the synchronization period can be adjusted to accommodate various implementations of the microprocessor. This adjustment feature is particularly important to embedded microprocessor implementations where tradeoffs in die size can dictate a wide range of trace memory 150 implementations.

Figure 6:
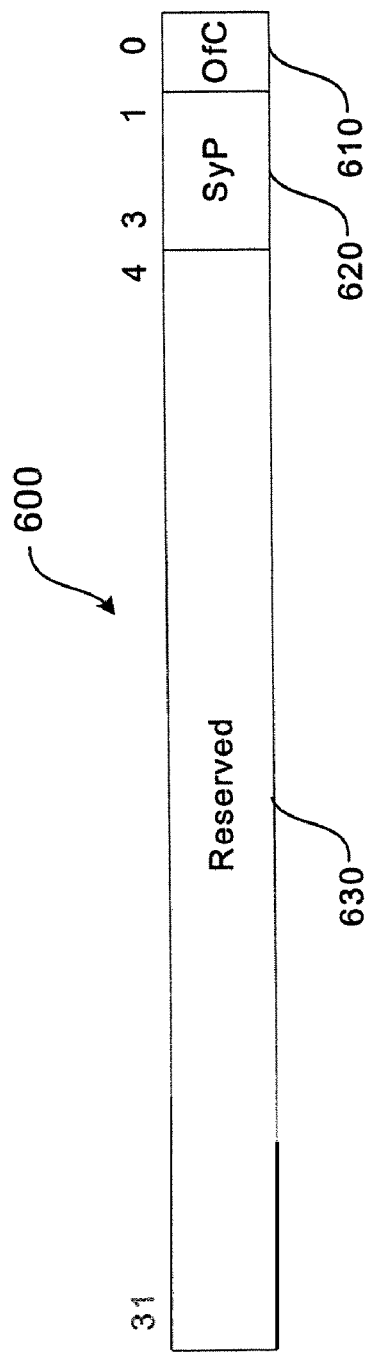
FIG. 6 illustrates an embodiment of a first trace control register.

In one embodiment, the value of the PDI_SyncPeriod[2:0] signal is stored in a trace control register. An embodiment of the trace control register is illustrated in FIG. 6. As illustrated trace control register 600 includes OfC field 610, SyP field 620, and Reserved field 630. OfC field 610 includes a single bit that indicates whether trace memory 150 is located on or off chip. SyP field 620 includes the three bits (see Table 8) that are contained in the PDI_SyncPeriod[2:0] signal that is transmitted from TCB 130 to TGL 120.

The bits in OfC field 610 of trace control register 600 are used to set an internal counter. Tracing of the synchronization information is triggered when the internal counter overflows.

One of the primary elements of the synchronization information is the full PC value. The full PC value is required periodically because compression module 410 in FIG. 4 may compress the PC values to conserve trace bandwidth. General compression of trace data is described in greater detail below.

In one embodiment, the PC values that are output by TGL 120 are compressed by transmitting the difference between the present PC value and the most recently transmitted PC value. This form of delta-compression transmission can be reconstructed only if the previous PC value has been received. In situations where trace data is lost, full PC values cannot be generated using the compressed PC values. Trace regeneration software 160 therefore loses its ability to reconstruct the program trace.

If multiple instances of the full PC value are assured to be stored in trace memory 150, then trace regeneration software 160 can reacquire a starting point for the reconstruction of the program trace. Even if the full PC value is obtainable from trace memory 150, however trace regeneration software 160 may still be unable to acquire an accurate view of the hardware and software state of software executing on microprocessor core 110.

For example, if a loop of instructions is being executed, the identification of a full PC value does not provide an accurate picture of the dynamic location of the PC. In other words, knowledge of the PC value does not enable trace regeneration software 160 to determine the iteration of the loop in which the instructions were executing.

It is a feature of the present invention that the periodically generated synchronization information includes information beyond a PC value. In one embodiment, the periodically generated synchronization information includes one or more of the load/store addresses, ASID value, and processor mode information.

As illustrated in Table 7, the PDI_TraceMode signal can be used to inform TGL 120 of what types of data should be traced. If a value of '000' is sent, TGL 120 will output only PC trace data. In this scenario, the periodic synchronization information includes the PC and the processor mode/ASID value to enable trace regeneration software 160 to resynchronize itself with the program execution.

If the PDI_TraceMode signal informs TGL 120 to trace the load/store addresses, then the full load/store address information is traced when the next load/store instruction is traced. The inclusion of the load/store addresses in the periodic output has many uses that include, but are not limited to: (1)

pin-pointing an iteration within loop, (2) acquiring a full address instead of a delta (compressed) load/store address, and (3) general synchronization with program execution.

More generally, it is a feature of the present invention that the periodic transmission of synchronization information enables trace regeneration software 160 to reacquire an accurate view of the software state of the computer system being traced. In that regard, the processor mode and ASID value are important pieces of information that enable trace regeneration software 160 to corroborate its assumption of the current processor state.

Figure 7:
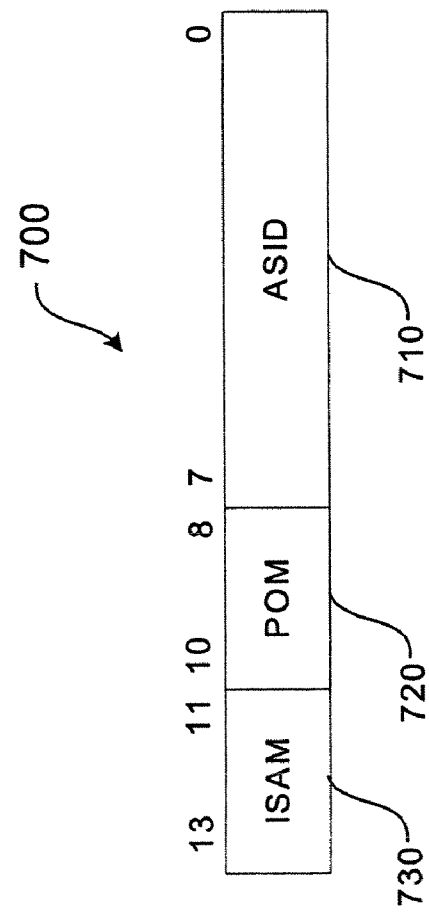
FIG. 7 illustrates an embodiment of a trace record including software state information.

In one embodiment, the processor mode and ASID value are traced out using the trace record illustrated in FIG. 7. Trace record 700 includes ASID field 710, processor operating mode (POM) field 720, and instruction set architecture mode (ISAM) field 730.

ASID field 710 includes an indication of the eight-bit ASID value for the process currently being traced. POM field 720 includes an indication of the processor mode. In one embodiment, POM field 720 includes two bits that enables an indication of one of a kernel mode, supervisor mode, user mode, and debug mode. ISAM field 730 includes an indication of the particular instruction set architecture being used. In one embodiment, ISAM field 720 includes two bits that enables an indication of one of the MIPS16™, MIPS32™, and MIPS64™ architectures.

Like the PC value and the load/store address, trace record 700 is transmitted from TGL 120 to TCB 130 over trace bus PDO_AD. The trace data type indicated using the PDO_TType[2:0] signal is TMOAS, as illustrated in Table 5 ('101').

In general, it should be noted that trace record 700 should be traced whenever there is a change in the ASID value. The same transaction is also used to trace changes in the POM and ISAM.

As thus described, the input signals of Table 7 provide a mechanism for effecting hardware control over the tracing process. It is a feature of the present invention that tracing can be controlled not only via the input signals of Table 7, but also from commands from within a program itself. These commands effect control over the tracing process through the use of a software-settable trace control register.

In operation, the user can compile a program with the trace controls included in the compiled code. The compiled code then initiates tracing on its own, without requiring the user's physical presence to initiate tracing using debugger breakpoints or other interactive trace commands.

To illustrate the advantage of this debugging feature, consider a scenario where a particular section of code of a program is being debugged. In accordance with the present invention, tracing can be initiated from within the program whenever that particular section of code is entered. Tracing can also be stopped whenever execution leaves that section of code. This software-trace-control feature is especially useful in debugging long-running operations, such as booting an operating system where the section of code of interest occurred hours into the booting process.

Figure 8:
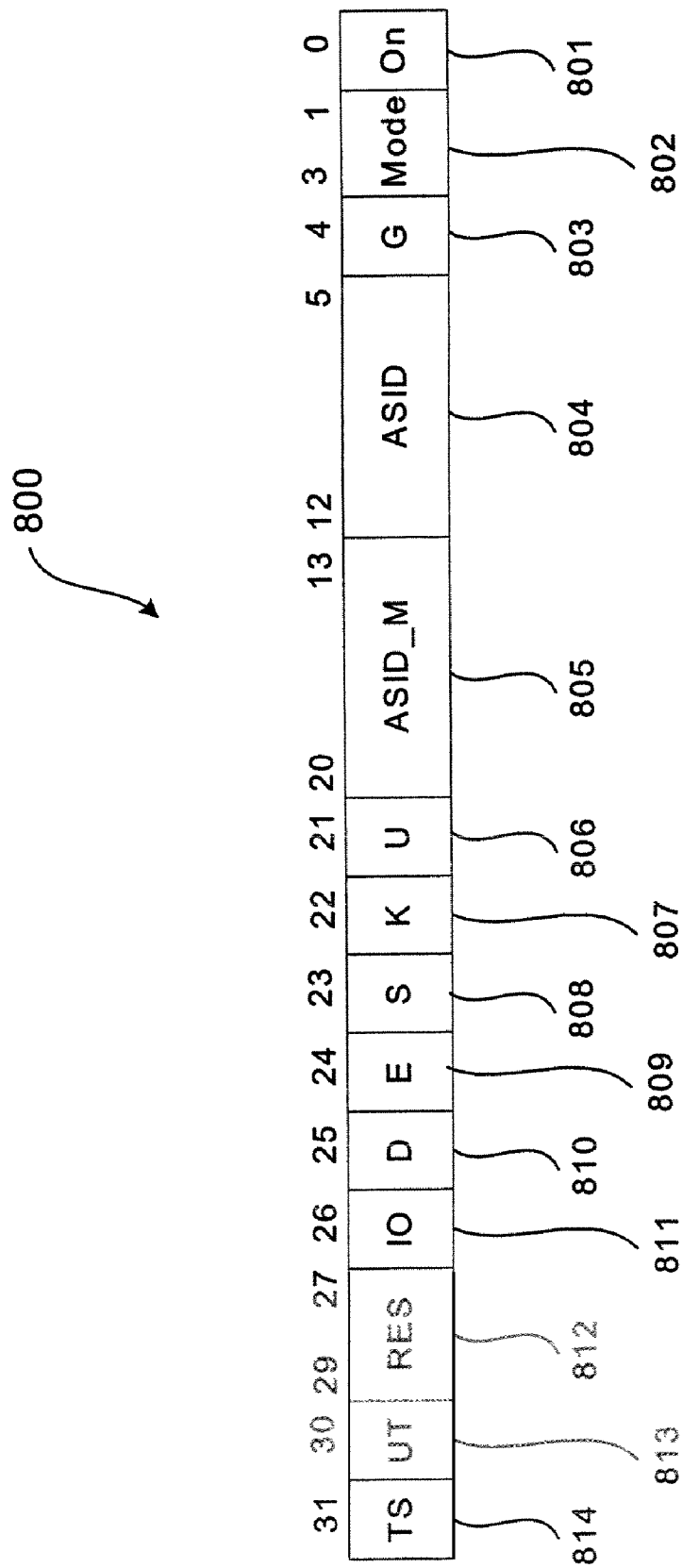
FIG. 8 illustrates an embodiment of a second trace control register.

An embodiment of the software-settable trace control register is now described with reference to trace control register 800 of FIG. 8. Trace control register 800 includes On field 801, Mode (M) field 802, Global (G) field 803, ASID field 804, ASID_M field 805, User Mode (U) field 806, Kernel Mode (K) field 807, Supervisor Mode (S) field 808, EXL field 809, Debug Mode (D) field 810, Inhibit Overflow (IO) field 811, Reserved (RES) field 812, User Trigger (UT) field 813, and Trace Select (TS) field 814.

In general, the software-settable fields 801-814 contained within trace control register 800 enable similar trace control functionality as the input signals illustrated in Table 7. In particular, trace control fields 801-804 and 806-811 have direct counterparts to the equivalent signals of Table 7. Accordingly, trace control fields 801-804 and 806-811 are not described in greater detail here. The remaining trace control fields, ASID_M field 805, UT field 813, and TS field 814, are described below. Trace control field 812 is designated as being served (RES).

TS field 814 is generally operative to enable the selection between either hardware or software based trace control. A TS value of one indicates a selection of external hardware trace control using signals generated by TCB 130, while a TS value of zero indicates a selection of internal software trace control based upon the contents of trace control register 800.

ASID_M field 805 is operative to indicate a mask value that is applied to the ASID comparison. As noted, the ASID comparison is performed when the PDI_G signal or the bit in G field 803 is not set, thereby indicating that all processes are not being traced. The ability to mask the ASID value provides additional flexibility in enabling the tracing of multiple processes. For example, multiple processes can be identified and traced based upon an identifiable set of higher-order bits in ASID_M field 805. In one embodiment, masked bits are identified with a "0" value, while unmasked bits are identified with a "1" value.

UT field 813 is used to indicate a type of user-trace-data (UTD) record. This UTD record is based upon the contents of a UTD register that is written to by software. The UTD record is created upon a write to the UTD register.

As noted in Table 5 above, the UTD record is traced out on trace bus PDO_AD with PDO_TType[2:0] having a value of '110' (type 1) or '111' (type 2). The type 1 and type 2 UTD records are reflected in the state of the bit in UT field 813. In one embodiment, UT field can be designed to accommodate additional bits for indications of additional types of UTD records.

It is a feature of the present invention that the UTD record enables a user to trace out any data value that can be written into the UTD register. As such, the UTD record can include any general processor register value, any program variable value, or any other debug-related information that is observable during program execution. This functionality enables a program to effectively trace itself without interactive user commands. Flexibility in tracing intermediate values, a small subset of data values, or specific points or aspects of program execution is thereby improved.

As described, the principles of the present invention enable increased control and flexibility in the tracing process. These elements of control provide users with effective tools in carrying out debugging procedures. Greater visibility into the execution of the processing system is also achieved through the increased accessibility in identifying parameters of the hardware/software state during execution.

In accordance with the present invention, performance of the tracing system can also be improved through the efficient use of tracing bandwidth. Conservation of bandwidth is effected through the compression modules described briefly above with reference to FIG. 4. As noted, compression modules 410 and 430 are operative to compress trace data that is to be transmitted to TCB 130.

Compression modules 410 and 430 are operative to compress a variety of data types. Trace information to be transmitted can include PC, load/store addresses, load/store data processor mode information, and user-defined data values.

These different types of trace data are identified during transmission on trace bus PDO_AD using the PDO _TType[2:0] signal defined in Table 5.

As noted, in one embodiment, the compression option that is applied to the trace data can be chosen from a set of compression options that are defined for the particular type of trace data that is being traced. In other words, the PDO_TMode signal that defines the type of compression (or mode of transmission) being used is dependent upon the value of the PDO_TType signal. In one embodiment, the PDO_TMode signal takes on the values of Table 9 relative to the PDO_TType signal values.

TABLE 9

| PDO_TType | PDO_TMode |
|---|---|
| 000 | Reserved |
| 101 | |
| 001 | 0: delta from last PC value |
| | 1: compression option A (full address) |
| 010 | 0: delta from last data address of that type |
| 011 | 1: compression option B (full address) |
| 100 | 0: compression option C (full data) |
| 110 | 1: compression option D (full data) |
| 111 | |

In the illustrated embodiment of Table 5, a PDO_TType value of '001' is used when transmitting the PC value. For this type of trace data, two compression modes are define. In the first compression mode identified by a PDO_TMode value of '0.' the delta value relative to the PC value of the previous instruction is used. This form of compression is efficient and desirable when the PC value is sequentially related to the previous PC value. If the PC value is independent of the previous PC value, then an alternate compression option A can be identified by a PDO_TMode value of '1.' Compression option A can represent any compression option that is expected to produce significant compression results when applied to a full PC address value.

As further illustrated in Table 9, delta compression can also be used for PDO_TTypes with a value of '010' (load address) and '011' (store address). These trace data types can also appear in a sequential pattern or exhibit a fair degree of locality and can therefore take advantage of delta compression. Alternately, the PDO_TMode signal can identify an alternate compression option B to be used for load/store address compression.

Finally, PDO_TTypes '100' (data value), '110' (user-defined trace record—type 1) and '111' (user-defined trace record—type 2) define full data values. Compression of these full data values is accomplished through the PDO_TMode signaling of either compression option C or compression option D. In general, the choice of compression options C and D can be based upon some expectation of the type of data that is to be compressed.

In the embodiment described above, the selection of compression options A-D can be based upon some expectation of the characteristics of the data that is to be compressed. For example, delta compression was selected as one of the possible compression options for data that was reasonably believed to have some sequential relation to prior transmissions.

In an alternative embodiment, a set of compression options can be applied to the trace data regardless of the characteristics of the expected trace data. In this embodiment a set of compression options can be selected to cover a wide range of potential compression scenarios. Each of the selected compression options can then be applied to a particular piece of trace data without prior knowledge of the expected compression quality of the result. For that particular piece of trace data, the best compression result from the set of compression options can be selected. The selected compression option can then be signaled to TCB 130 using the PDO_TMode signal. In general, this compression mechanism effects a dynamic selection of the compression option for the trace data.

Figure 9:
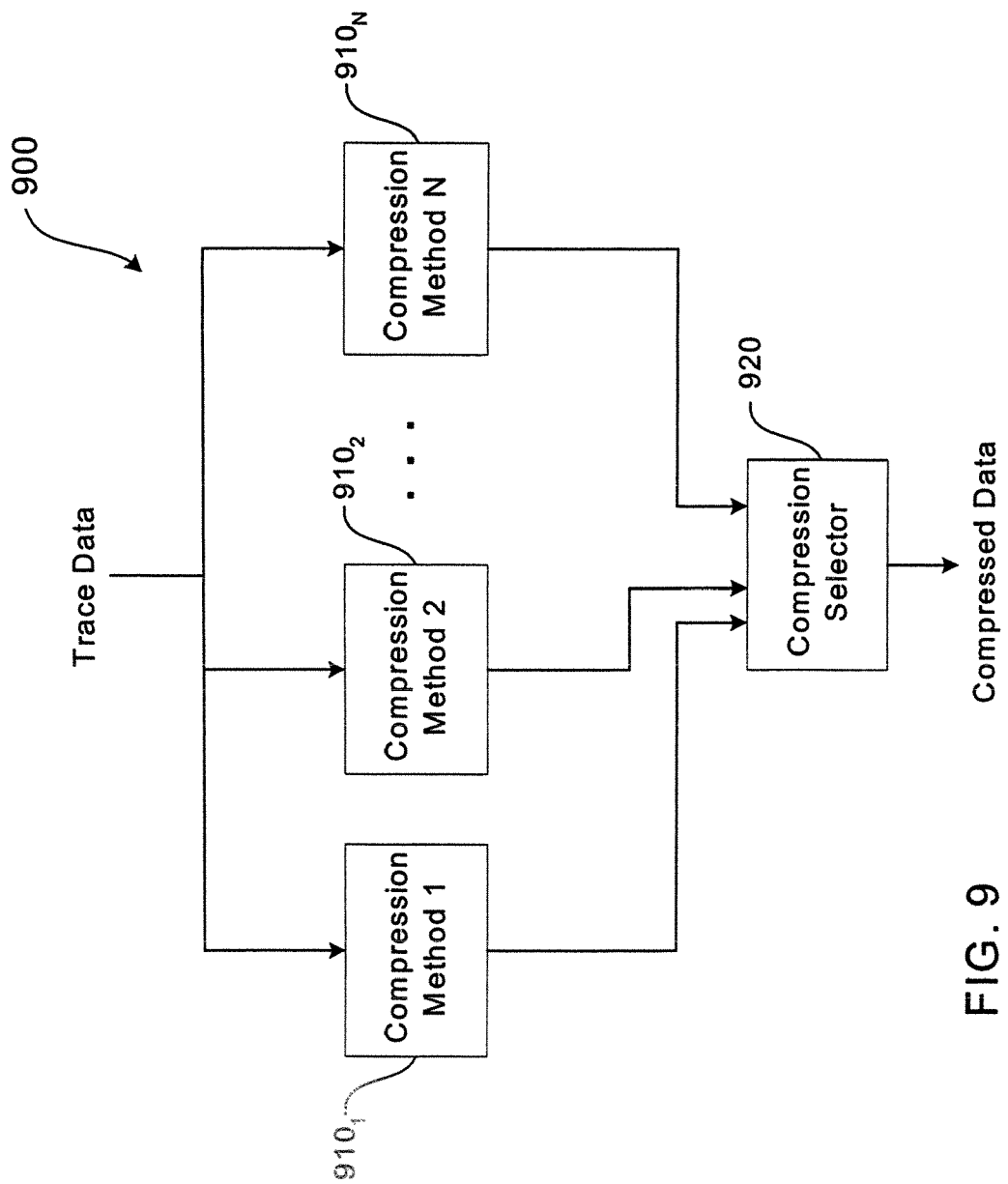
FIG. 9 illustrates an embodiment of dynamic compression selection.

An embodiment of the logic that embodies a dynamic compression selection option is illustrated in FIG. 9. It should be noted that compression selection logic 900 can be incorporated into one or more of compression modules 410, 430 of TGL 120.

Compression selection logic 900 includes compression modules $910_1$-$910_N$. Each of compression modules $910_1$-$910_N$ operates on the same piece of trace data that is to be transmitted. In general, compression modules $910_1$-$910_N$ can represent any set of compression methods that can be used to compress a set of bits. In one embodiment, compression modules $910_1$-$910_N$ can be based on such compression-based methods as delta compression, bit-block compression, run length encoding, variable bit-block compression, or the like. Bit-block compression, run length encoding, and variable bit-block compression are described in greater detail in Faloutous et al., "Description and Performance Analysis of Signature File Methods for Office Filing," ACM transactions on Office Information Systems, Vol. 5 No. 3 July 1987, pages 237-257, which is herein incorporated by reference in its entirety Other bit compression methods can also be used by the present invention.

As noted, each of compression modules $910_1$-$910_N$ is operative to generate a compression result for the input trace data. The trace data may represent a PC value, a load/store address value, a load/store data value, processor mode information, or a user-defined data value. Regardless of the trace data type, each of compression modules $910_1$-$910_N$ will produce a result that is forwarded to compression selector module 920.

Compression selection module 920 is operative to compare the outputs of compression modules $910_1$-$910_N$ to determine which compression option most efficiently compresses the input trace data. In this process, the dynamic selection of the compression outputs ensures that an efficient compression mechanism has been selected for each piece of trace data.

The compression method selected is then signaled to TCB 130. As noted, this signaling can be based on a PDO_TMode signal. A single PDO_TMode signal can be used to indicate the selection of one of the compression methods embodied in compression modules $910_1$-$910_N$. It should be noted that in one embodiment, one of the compression methods is selected as the default form of compression.

In addition to implementations of the invention using hardware, the invention can be embodied in a computer usable medium configured to store a computer readable program code. The program code causes the enablement of the functions or fabrication, or both, of the invention disclosed herein.

For example, this can be accomplished through the use of general programming languages (e.g., C, C++, etc.), hardware description languages (HDL) including Verilog HDL, VHDL, Altera Hardware Description Language (AHDL) and so on, or other programming and/or circuit (i.e., schematic) capture tools available in the art.

The program code can be disposed in any known computer usable (e.g., readable) medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets.

It is understood that the functions accomplished by the invention as described above can be represented in a core which is embodied in programming code and transformed to hardware as part of the production of integrated circuits. Also, the invention may be embodied as a combination of hardware and software.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A tracing control method, comprising:
    initiating first tracing of data in a first processor mode of an embedded processor, said first tracing being from said embedded processor to a trace memory during execution of a program that includes a plurality of instructions, said first tracing initiation being based on a first trace control command embodied in one or more instructions of said program; and
    halting second tracing of data in a second processor mode of said embedded processor based upon a second trace control command embodied in one or more instructions of said program without disabling said first tracing;
    wherein said first trace control command and said second trace control command are operative to trigger tracing on for said first tracing of data and off for said second tracing of data without using one or more breakpoints.

2. The tracing control method of claim 1, wherein said first processor mode has a higher privilege than said second processor mode.

3. The tracing control method of claim 2, wherein said first processor mode is kernel mode, and said second processor mode is user mode.

4. The tracing control method of claim 2, wherein said first processor mode is supervisor mode, and said second processor mode is user mode.

5. The tracing control method of claim 1, wherein a trace control indication is embodied in a field of a trace control register that is written to upon execution of a trace control command.

6. The tracing control method of claim 1, wherein said first trace control command is inserted in an entry point to a section of code, and said second trace control command is inserted in an exit point to said section of code.

7. The tracing control method of claim 1, wherein said first trace control command and said second trace control command are included within said program prior to execution of said program.

8. A computer program product comprising:
    computer-readable program code for causing a computer to describe an embedded processor, said embedded processor including a processor core for executing instructions, and trace generation logic that is operative to generate trace data for said instructions executing in said processor core, said trace generation logic capable of applying said trace data to a trace memory and being controlled by hardware input signals and by a software-settable trace control register adapted to be set by at least one trace control command embodied in instructions of a program to be traced, wherein said software-settable trace control register includes a first field operative to enable tracing in a first processor mode of said embedded processor, and a second field operative to disable tracing in a second processor mode of said embedded processor without disabling tracing in said first processor mode; and
    a computer-usable medium configured to store the computer-readable program code, wherein said embedded processor is operative to utilize said at least one trace control command to trigger tracing on and off without requiring the use of one or more breakpoints.

9. A computer-readable storage medium, comprising executable instructions to:
    cause a computer to describe an embedded processor, said embedded processor including a processor core for executing instructions, and trace generation logic that is operative to generate trace data for said instructions executing in said processor core, said trace generation logic capable of applying said trace data to a trace memory and being controlled by hardware input signals and by a software-settable trace control register adapted to be set by at least one trace control command embodied in instructions of a program to be traced, wherein said software-settable trace control register includes a first field operative to enable tracing in a first processor mode of said embedded processor, and a second field operative to disable tracing in a second processor mode of said embedded processor without disabling tracing in said first processor mode;
    wherein said embedded processor is operative to utilize said at least one trace control command to trigger tracing on and off without requiring the use of one or more breakpoints.

* * * * *